United States Patent [19]

Schneider et al.

[11] Patent Number: 4,729,786

[45] Date of Patent: Mar. 8, 1988

[54] PROCESS FOR THE DIRECT REDUCTION OF IRON-OXIDE-CONTAINING MATERIALS

[75] Inventors: Hermann Schneider, Leonding; Konstantin Milionis, Graz; Hermann Pusch, Linz, all of Austria

[73] Assignee: Voest-Alpine Aktiengesellschaft, Austria

[21] Appl. No.: 760,943

[22] Filed: Jul. 31, 1985

[30] Foreign Application Priority Data

Aug. 16, 1984 [AT] Austria .................................. 2633/84

[51] Int. Cl.$^4$ ............................................ C21B 13/02
[52] U.S. Cl. ......................................... 75/35; 266/160
[58] Field of Search ................. 75/26, 35, 33, 34, 38; 48/202, DIG. 2; 266/160

[56] References Cited

U.S. PATENT DOCUMENTS

| | | | |
|---|---|---|---|
| 3,853,538 | 12/1974 | Nemeth | 75/35 |
| 4,095,960 | 6/1978 | Schuhmann, Jr. | 48/202 |
| 4,173,465 | 11/1979 | Meissner et al. | 75/35 |
| 4,248,626 | 2/1981 | Scarlett et al. | 75/38 |
| 4,260,412 | 4/1981 | Summers et al. | 75/35 |
| 4,317,677 | 3/1982 | Weber et al. | 75/43 |

FOREIGN PATENT DOCUMENTS

| | | | |
|---|---|---|---|
| 2083839 | 3/1981 | United Kingdom . | |
| 2078779 | 1/1982 | United Kingdom | 75/29 |
| 2084196 | 4/1982 | United Kingdom | 75/38 |

Primary Examiner—Melvyn J. Andrews
Attorney, Agent, or Firm—Ostrolenk, Faber, Gerb & Soffen

[57] ABSTRACT

There is disclosed a process for the direct reduction of iron-oxide-containing materials by a gasification gas produced in a gasifier by reacting carbon with oxygen and, if desired, with steam, upon the addition of sulfur acceptors in a fluidized bed. The gasification gas is supplied to a direct reduction shaft furnace after separation of solid particles carried therewith. At least part of the top gas withdrawn from the direct reduction shaft furnace is compressed after dust scrubbing and is recycled to the gasifier. The sulfur acceptors are supplied as fine particles separated from the coal in cocurrent with, and/or counterflow to, the fluidized-bed forming gases. The top gas from the reduction shaft furnace, which has a concentration of from 15 to 30% $CO_2$ and a temperature of from 80° to 800° C., is recycled laterally through the wall of the gasifier into the region of the fluidized bed, which is maintained at a temperature of at least 1,150° C. The slag, which is in the molten state with the temperature prevailing in the gasifier, containing ashes and sulfur compounds and collecting under the formation of a bath, is removed via a tap in the vicinity of the bottom of the gasifier. The solid particles separated from the gasification gas are mixed with dust coal having a grain size of up to 3 mm and are recycled into the bottom region of the gasifier above the surface of the slag bath.

14 Claims, 1 Drawing Figure

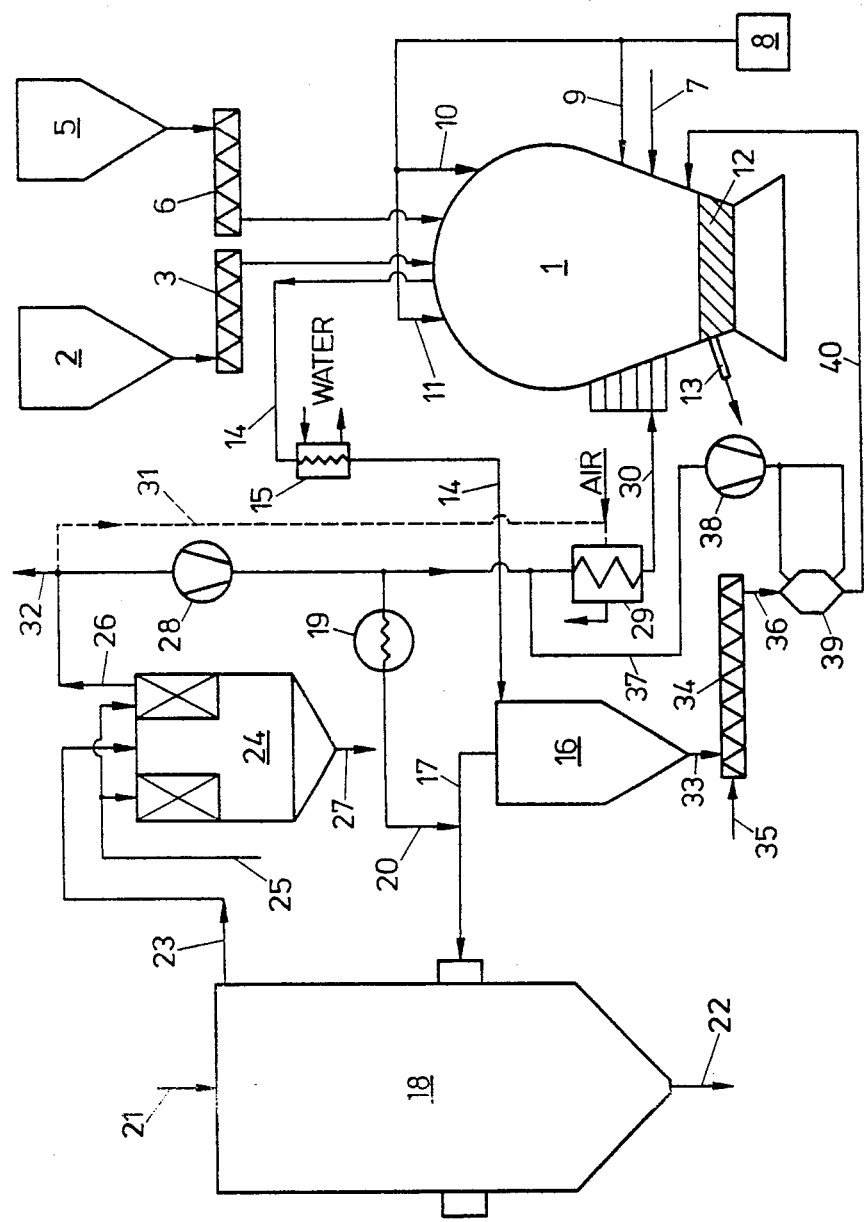

PROCESS FOR THE DIRECT REDUCTION OF IRON-OXIDE-CONTAINING MATERIALS

The invention relates to a process for the direct reduction of iron-oxide-containing materials by means of a gasification gas produced in a gasifier by reacting carbon with oxygen and, if desired, with steam, upon the addition of sulfur acceptors in a fluidized bed, wherein the gasification gas is supplied to a direct reduction shaft furnace after separation of solid particles carried therewith and at least part of the top gas withdrawn from the direct reduction shaft furnace is compressed after dust scrubbing and is recycled to the gasifier.

A process of this type is described in U.S. Pat. No. 4,260,412, in which coal that has been comminuted to a sufficiently small particle size—preferably less than 10 mm—is reacted in a gasifier with steam and oxygen under formation of a fluidized bed. The reaction temperature lies below the fusion temperature of the slag; the slag or ash particles fall out of the fluidized bed in an agglomerated solid form and must be removed from the reactor by a means of a complex discharge system. Moreover, a most accurate temperature adjustment is necessary in order to maintain the desired ash consistency.

The top gas produced in the reduction shaft furnace is recycled into the gasifier at least partially after having been dust-scrubbed, cooled and freed from acid gases, such as $CO_2$ and $H_2S$, in a deacidification plant. The acid gases are discarded. Another portion of the deacidified top gas is recycled to the direct reduction shaft furnace after reheating.

By the removal of $CO_2$ from the top gas, the mass and heat balances of the process are negatively affected, because the respective amounts of coal and oxygen that have not been utilized for the reduction must be fed to the gasifier anew. Moreover, steam or any other source of thermal energy is required to regenerate the washings in the acid-gas removing unit.

The invention aims at avoiding these disadvantages and difficulties and has as its object to provide a process of the initially defined kind, which is operable at elevated temperatures and with which the coal and oxygen supplied are utilized in a better way. A further object of the invention is to take full economic advantage in that the coal need not be broken into a particular grain size, but may be used in the form of two fractions with fine and coarse grainings, i.e., substantially as delivered.

With a process of the initially defined kind, the set object is achieved according to the invention in that the sulfur acceptors and, if desired, further fluxes, are supplied as fine particles separate from the coal in cocurrent with, and/or counterflow to, the fluidized-bed forming gases, the top gas from the reduction shaft furnace, which has a concentration of from 15 to 30% $CO_2$ and a temperature of from 80° to 800° C., is recycled laterally through the wall of the gasifier into the region of the fluidized bed, which is maintained at a temperature of at least 1,150° C., the slag, which is in the molten state with the temperature prevailing in the gasifier, containing ashes and sulfur compounds and collecting under the formation of a bath, is removed via a tap provided in the vicinity of the bottom of the gasifier, and the solid particles separated from the gasification gas are mixed with dust coal having a grain size of up to 3 mm and are recycled into the bottom region of the gasifier above the surface of the slag bath.

With the known process, a particulate sulfur acceptor is introduced into the lower part of the gasifier, together with the coal. With this type of introduction, the sulfur is not sufficiently effectively removed from the gasification gas formed. As sulfur acceptors limestone, burnt lime, lime hydrate and dolomite may, for instance, be used. As additional fluxes for controlling the amount, composition and consistency of the slag bath forming, sand and/or fluorspar may, for instance, be added.

With the process according to the invention, the gasification gas leaves the gasifier at a temperature of at least 950° C., having a sulfur content of less than 50 ppm and a reduction degree $$R = \frac{H_2 + CO}{H_2O + CO_2}$$

of from 15 to 30.

In a recycled top gas coming from the direct reduction shaft furnace, water and $CO_2$ are contained. The carbon dioxide partially is reformed into carbon monoxide in the gasifier, the water content causes an increase in the hydrogen portion of the gasification gas, thus allowing for a reduced supply of oxygen.

Suitably, a fraction of the coal used for the production of gasification gas, which has a grain size of from 3 to 25 mm, is introduced through the top part of the gasifier. Due to the high temperature prevailing in the gasifier, an instantaneous bursting of the coarse coal particles occurs. The grain size of the resulting coal particles allows for their incorporation in the coal fluidized bed.

According to an advantageous embodiment of the process according to the invention, a portion of the dedusted and compressed top gas is added to the gasification gas after having passed through a refrigeration drier, to adjust the ratio of carbon monoxide to carbon dioxide and to adjust the temperature of the resulting reduction gas to be in a range of from 750° to 1,000° C.; this reduction gas is introduced into the reduction shaft furnace.

By adjusting the temperature and the ratio of CO to $CO_2$ of the reduction gas in this manner, it is possible to readily adapt the reduction conditions to the iron-oxide-containing material supplied to the direct reduction shaft furnace, such as lumpy ores, pellets or sinter, and, furthermore, to control the carbon content in the directly reduced iron produced (DRI).

The top gas is added to the gasification gas, in particular, with a water content of less than 1%.

The highly metallized product obtained with the process according to the invention, which has a metallization degree of from 90 to 98%, has a sulfur content of no more than 0.03 to 0.05%, its carbon content being adjustable within limits of about 1.0 to 3.0%. It is excellently suited as charging material in an electric arc furnace or a plasma furnace for steel production purposes.

Suitably, the recycled top gas is preheated prior to being introduced into the gasifier by burning another partial amount of the dedusted top gas, preferably to a temperature of between 500° and 700° C.

It is also possible to supply the recycled, dedusted and compressed portion of the top gas to the gasifier without preheating. In this case, the temperature of the top gas, which, i.a., is dependent on the degree of compression, amounts to about 80° to 200° C. The pressure in the gasifier is adjusted to a value of between 2.5 and 5.5 bar. In the shaft furnace, there is a pressure of 2 to 5 bar, wherein the pressure prevailing within the gasifier must, of course, always be higher than that of the shaft furnace, i.e., by at least 0.3 bar.

Advantageously, 30 to 50% of the total top gas formed is recycled to the gasifier.

A further portion—as stated above—may be used to preheat the recycled top gas, only a possibly remaining residual amount leaving the reduction plant as excess gas.

According to another advantageous embodiment of this process, the sulfur acceptors, and, if desired, additional fluxes are supplied to the gasifier simultaneously at several points. The points of supply may be provided both in the top part and in the lower part of the gasifier, favorably immediately above the slag bath surface, and the fine-particle sulfur acceptors, which preferably are ground to a grain size of below 0.1 mm, get into intimate contact with both the carbon particles of the fluidized bed and the gasification gas formed in the top part of the gasifier, as they are blown in by a conveying gas independently of the coal charged. The desulfurization degree attainable has been largely improved as compared to the known process. Accordingly, the already mentioned particularly low sulfur content of no more than approximately 0.03 to 0.05% is also reached in the metallized product (DRI), which can be used directly for the production of high-quality steels without any further desulfurization.

The solid particles separated from the gasification gas suitably are cooled prior to being recycled into the gasifier, i.e., prior to, or simultaneously with, mixing with the dust coal. The temperature of the solid particles or mixture after cooling is about 60° C.

The mixture of solid particles separated from the gasification gas and of dust coal particularly advantageously is blown into the gasifier with compressed top gas.

The invention will now be explained in more detail by way of the plant scheme illustrated in the accompanying drawing.

Into the top part of a gasifier 1, there enter supply ducts for lump coal and for fluxes. The coal is fed from a storage container 2 by means of a screw conveyer 3, the fluxes are conveyed to the gasifier 1 from a storage container 5 via a screw conveyor 6.

Oxygen-containing gas is supplied in the lower part of the gasifier through a duct 7 and finely ground sulfur acceptors from a storage tank 8 are blown into the lower part and into the top part of the gasifier 1 with a conveying gas, through branch ducts 9, 10 and 11. In the gasifier 1, a carbon fluidized bed is maintained by appropriate flow rates of the blown-in gases. The temperature of the fluidized bed is kept at at least 1,150° C., at which temperature the non-gasifiable ash portions of the coal occur in the molten state and the compounds formed with the sulfur acceptors, such as calcium sulfide, are converted into slag.

The liquid slag collects in the bottom part of the gasifier 1 by formation of a slag bath 12 and is discontinuously withdrawn via a tap 13. The gasification gas formed leaves the top part of the gasifier 1 through a duct 14 and, according to the embodiment illustrated, is cooled to a temperature below the solidification temperature of the slag in a cooler 15 indirectly by heat exchange with water. Subsequently, the gasification gas enters a dust separating unit 16, which may be comprised of at least one hot cyclone.

The gasification gas freed from carried solid particles is supplied to a direct reduction shaft furnace 18 via a duct 17. Re-heating of the gas prior to its introduction into the shaft furnace 18—as is required with the known process—is omitted with the process of the invention. Before or after the dust separating unit 16, the gasification gas advantageously may be mixed with a certain portion of dedusted and compressed top gas recycled from the shaft furnace 18 in order to adjust the temperature and the $CO/CO_2$-ratio of the resulting reduction gas to the desired values. Since the recycled top gas contains water in addition to $CO_2$, it is added to the gasification gas only after having passed a refrigeration drier 19. In the embodiment illustrated, a duct 20 carrying relatively cool top gas with a water content of, preferably, less than 1%, runs into the duct 17 after the dust separating unit 16. If the supply of the cool top gas into the duct 14 takes place before the unit 16, the temperature of the unit 16 may be kept lower, yet the unit must be laid out for a larger gas flow rate.

Iron-oxide-containing material 21 is top-charged into the shaft furnace 18, getting into contact with the hot dust-free reduction gas in counterflow and being reacted into a highly metallized product (DRI) 22. The DRI 22 produced is discharged from the shaft furnace 18 in a known manner, either cold at a temperature of about 50° C. or hot at a temperature of about 700° to 800° C. Hot DRI discharged by means of screw conveyors can directly be briquetted after removal of carbon dust.

The partially oxidized reduction gas leaves the shaft furnace 18 as top gas through a duct 23 to get to a dust scrubbing plant 24, which particularly advantageously is fed with hot water 25 from the coooler 15. In this manner, the top gas is cooled not too strongly, thus ensuring a certain content of humidity in the top gas, which, in turn, is suitable for controlling the temperature and for saving oxygen in the gasifier 1 as well as for increasing the hydrogen content in the gasification gas.

During dust scrubbing, the top gas reaches a temperature of about 50° to 75° C. and is collected in a duct 26. The separated residues 27 may be recharged into the shaft furnace 18 after drying. Part of the dedusted, steam-saturated and cooled top gas is recycled via a compressor 28 and, with the embodiment illustrated, via a heater 29 through a duct 30, which suitably comprises several mouths at different heights, into the fluidized bed zone laterally through the wall of the gasifier 1. An additional steam supply from an external steam source is obviated. The carbon dioxide contained in the top gas is again converted into carbon monoxide in the gasifier 1, which functions as a reformer. Recycling of the top gas at various points of the gasifier 1 has the advantage that the amount of the charged coal converted is increased and the dust losses are kept low.

If the recycled portion of the top gas is to be preheated to the preferred temperature of from 500° to 700° C., this preheating is effected in the heater 29, suitably by combustion of a further portion of the dedusted top gas coming from the branch duct 31 (illustrated in broken lines) with oxygen-containing gas, e.g., with air.

If there is still some remaining top gas, the latter is conducted away from the plant as excess gas 32 in order to prevent the portion of inert gas in the circulating gas from rising too high.

The solid particles 33 separated from the gasification gas in the dust separating unit 16, after having passed a sluice system, advantageously are mixed with dust coal 35 in a cooling worm 34 and at the same time are cooled to a temperature of about 60° C. The mixture 36 is recycled to the bottom region of the gasifier 1, wherein, in accordance with the drawing, it is particularly suitable if part of the top gas emerging from the compressor 28 is diverted into a duct 37 and compressed a second time in a compressor 38. The recompressed top gas, commonly with the mixture 36, enters a suspension vessel 39 and the solid-in-gas suspension produced there is blown into the bottom region of the gasifier 1 closely above the level of the slag bath 12, through a conduit 40. It has proved particularly favorable to arrange the mouths of the ducts of oxygen-containing gas 7, for the sulfur acceptors 9 and the duct 40 in approximately the same plane immediately above the slag bath surface. The fine-portion amount of the coal discharged is enormously reduced by this way of supplying dust coal.

The feed for oxygen-containing gas also may enter centrally into a jacket nozzle, and the suspension of separated solid particles and dust coal can be supplied to such a nozzle as a jacket fluid. The ducts for each of the media mentioned may, of course, be manifold, their mouths being provided so as to be symmetrically distributed over the periphery of the gasifier 1.

What we claim is:

1. A process for the direct reduction of iron oxide-containing materials comprising:
    (a) separately introducing into a gasifier having walls, a top portion and a bottom portion, feed materials comprising (i) coal, (ii) oxygen or oxygen admixed with steam, and (iii) a sulfur acceptor material, and reacting said feed materials in a fluidized bed maintained at a temperature of at least 1150° C., whereby a reducing gas containing CO and $H_2$ is produced and any ash portions of said coal and sulfur compounds formed from said sulfur acceptor materials are converted into liquid slag, said liquid slag forming a liquid bath;
    (b) withdrawing said reducing gas with entrained solid particles carried therein from said gasifier, separating said entrained solid particles from said reducing gas, and introducing said reducing gas into a shaft furnace;
    (c) introducing iron oxide-containing materials into said shaft furnace, said iron oxide being reduced by said reducing gas with the production of a reduced iron product and a top gas containing 15–30% $CO_2$, said top gas having dust carried therein;
    (d) withdrawing said reduced iron product from said shaft furnace;
    (e) withdrawing said top gas from said shaft furnace, separating said top gas from said dust carried therein and introducing at least a portion of said top gas at a temperature of 80°–800° C. into said gasifier laterally through a wall thereof into said fluidized bed;
    (f) admixing said solid particles separated from said reducing gas with dust coal having a grain size of up to 3 mm. and introducing the resultant mixture into the bottom region of said gasifier above the surface of said slag bath; and
    (g) tapping said bath in the vicinity of the bottom of said gasifier.

2. A process as set forth in claim 1, further comprising supplying additional flux material with said sulfur acceptor material.

3. A process as set forth in claim 1, wherein a fraction of said coal having a particle size of from 3 to 25 mm. is introduced through the top part of said gasifier.

4. A process as set forth in claim 1, further comprising passing a portion of the dedusted top gas through a refrigeration drier, adding said portion to said reducing gas for adjusting the ratio of carbon monoxide to carbon dioxide and for adjusting the temperature of said reducing gas to be in the range of from 750° to 1,000° C., and injecting said reducing gas into said shaft furnace.

5. A process as set forth in claim 4, wherein said top gas added to said reducing gas has a water content of less than 1%.

6. A process as set forth in claim 1, wherein said top gas introduced into said gasifier is first preheated by burning a portion thereof.

7. A process as set forth in claim 6, wherein said top gas is preheated to a temperature of from 500° to 700° C. before being introduced into said gasifier.

8. A process as set forth in claim 1, wherein 30 to 50% of said top gas formed in said shaft furnace is introduced into said gasifier.

9. A process as set forth in claim 1, wherein said sulfur acceptor materials supplied to said gasifier simultaneously at several points.

10. A process as set forth in claim 2, wherein said additional flux material is supplied to said gasifier simultaneously at several points.

11. A process as set forth in claim 1, further comprising cooling said separated solid particles prior to reintroducing them into said gasifier.

12. A process as set forth in claim 1, wherein said mixture of said solid particles separated from said reducing gas and dust coal is blown into said gasifier with compressed top gas.

13. A process as set forth in claim 1, wherein said sulfur acceptor material is selected from the group consisting of limestone, burnt lime, lime hydrate and dolomite.

14. In a process for the direct reduction of iron oxide-containing materials with a reducing gas in a shaft furnace with the formation of a top gas, said reducing gas being produced in a gasifier having walls, a top portion and a bottom portion, by the reaction of coal with oxygen or with oxygen and steam in a fluidized bed in the presence of a sulfur acceptor material, with solid particles carried with said reducing gas being subsequently separated therefrom, and at least a portion of said top gas formed in said shaft furnace being separated from dust contained therein and introduced into said gasifier, the improvement comprising:
    (a) maintaining said fluidized bed at a temperature of at least 1,150° C., whereby any non-gasifiable ash portions of said coal and sulfur compounds formed from said sulfur acceptor materials are converted into liquid slag, said liquid slag forming a liquid bath in said bottom portion of said gasifier;
    (b) introducing said top gas containing 15 to 30% $CO_2$ at a temperature of 80°–800° C. into said gasifier laterally through a wall thereof into the region of said fluidized bed; and
    (c) tapping said bath in the vicinity of the bottom of said gasifier.

* * * * *